US011755624B2

(12) United States Patent
Hirate et al.

(10) Patent No.: US 11,755,624 B2
(45) Date of Patent: Sep. 12, 2023

(54) PROCESSING SYSTEM, PROCESSING DEVICE, PROCESSING METHOD, PROGRAM, AND INFORMATION STORAGE MEDIUM

(71) Applicant: Rakuten Group, Inc., Tokyo (JP)

(72) Inventors: Yu Hirate, Tokyo (JP); Hiroki Mihara, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1281 days.

(21) Appl. No.: 16/317,072

(22) PCT Filed: Jul. 31, 2017

(86) PCT No.: PCT/JP2017/027764
§ 371 (c)(1),
(2) Date: Jan. 11, 2019

(87) PCT Pub. No.: WO2019/026152
PCT Pub. Date: Feb. 7, 2019

(65) Prior Publication Data
US 2021/0374160 A1  Dec. 2, 2021

(51) Int. Cl.
*G06F 16/00* (2019.01)
*G06F 16/28* (2019.01)
*G06Q 30/0201* (2023.01)

(52) U.S. Cl.
CPC ....... *G06F 16/285* (2019.01); *G06Q 30/0201* (2013.01)

(58) Field of Classification Search
CPC .. G06F 16/285; G06F 16/906; G06Q 30/0201
See application file for complete search history.

(56) References Cited

U.S. PATENT DOCUMENTS

| 2011/0093327 A1* | 4/2011 | Fordyce, III ....... G06Q 30/0224 |
| | | 705/14.39 |
| 2012/0096003 A1* | 4/2012 | Motohashi .............. G06F 16/35 |
| | | 707/E17.089 |

(Continued)

FOREIGN PATENT DOCUMENTS

| EP | 3196777 A1 | 7/2017 |
| JP | 2006-092504 A | 4/2006 |
| JP | 5649756 B1 | 1/2015 |

OTHER PUBLICATIONS

Guillermo Navarro-Arribas et al., "Information fusion in data privacy: A survey", Information Fusion, vol. 13, 2012, pp. 235-244 (10 pages total).

*Primary Examiner* — Cheryl Lewis
(74) *Attorney, Agent, or Firm* — Sughrue Mion, PLLC

(57) ABSTRACT

In a processing system 101, a first processing device 111 obtains first characteristics information indicating characteristics of users in a first environment, divides the users into first clusters according to the first characteristics information, and transmits, to a second processing device 121, representation information representing characteristics of users belonging to each of the first clusters using a centroid vector based on the first characteristics information of the cluster. The second processing device 121 obtains second characteristics information indicating characteristics of the users in a second environment, and divides the users into second clusters according to the representation information and the second characteristics information. The present invention allows for dividing the users into clusters more accurately, although the second processing device 121 need not use the first characteristics information and the first processing device 111 need not use the second characteristics information.

11 Claims, 3 Drawing Sheets

(56) References Cited

U.S. PATENT DOCUMENTS

| | | | |
|---|---|---|---|
| 2013/0339085 A1* | 12/2013 | Sadeh | G06Q 30/0255 |
| | | | 705/7.29 |
| 2014/0274022 A1* | 9/2014 | Bell | G06F 16/29 |
| | | | 455/418 |
| 2016/0071129 A1* | 3/2016 | Ohhara | G06F 16/1734 |
| | | | 705/7.32 |
| 2017/0098181 A1* | 4/2017 | Herman | G06N 20/00 |
| 2017/0147606 A1* | 5/2017 | Milton | G06F 16/2471 |
| 2017/0193568 A1* | 7/2017 | Pattabiraman | G06Q 30/0222 |
| 2017/0206551 A1* | 7/2017 | Gupta | G06F 16/9535 |
| 2017/0303079 A1* | 10/2017 | Ikemoto | G06Q 30/02 |
| 2019/0189285 A1* | 6/2019 | Lowet | G16H 50/30 |
| 2020/0045071 A1* | 2/2020 | Harris | G06F 15/16 |

\* cited by examiner

PROCESSING SYSTEM, PROCESSING DEVICE, PROCESSING METHOD, PROGRAM, AND INFORMATION STORAGE MEDIUM

TECHNICAL FIELD

The present invention relates to techniques for dividing users into clusters separately using first characteristics information indicating characteristics of the users in a first environment and second characteristics information indicating characteristics of the users in a second environment.

BACKGROUND ART

It is a common practice to collect characteristics information indicating characteristics of users in an environment given to the users, classify the users into a plurality of segments using various types of clustering techniques, and devise, for example, a strategy for providing each segment with services.

For example, Patent Literature 1 discloses a technique for a classifier including an initial divider, an updater, a repeat controller, and an output unit.

The initial divider divides n targets into K clusters.

The updater updates the division into clusters by calculating, for each of the K clusters, a centroid of targets classified into the cluster;

associating each of the n targets with the nearest centroid to the target among the K centroids; and grouping each set of targets associated with a same centroid as one cluster to reclassify the n targets into the K clusters.

The repeat controller causes the updater to repeat the update until the division into clusters no longer changes.

After that, the output unit outputs this.

In this world, a plurality of services are provided, and characteristics information of users is collected in different environments. In these environments, different business operators provide different services to the users and often collect their characteristics information according to different privacy policies, service agreements, or regulations.

For example, a television viewing history server collects a user's viewing history in conjunction with a television used by the user via the Internet. When the user purchases items sold in an electronic marketplace, an electronic marketplace server collects the corresponding purchase history. The viewing history indicates a characteristic of the user in an environment where the user watches television programs. The purchase history indicates a characteristic of the user in an environment where the user purchases items in the electronic marketplace.

It is thus requested to classify users into clusters according to which of the users have common characteristics and analyze characteristics, activities, behavior, and the like of the users with high accuracy, by combining characteristics information of the users collected under two environments and performing clustering on the users.

On the other hand, Patent Literature 2 discloses a technique in which an information processing system, which combines characteristics data of customers included in a plurality of databases, combines characteristics data of customers who have similar characteristics.

CITATION LIST

Patent Literature

Patent Literature 1: JP 2006-092504 A
Patent Literature 2: JP 5649756 B

SUMMARY OF INVENTION

Technical Problem

In many cases, however, collection of characteristics information of users under different environments is subject to restrictions imposed by different privacy policies, agreements, or regulations.

Thus, it is often difficult to directly obtain and use both characteristics information of users collected in a first environment and characteristics information of the users collected in a second environment.

Therefore, there is a need for a technique for analyzing characteristics of the users separately using first characteristics information indicating characteristics of the users in the first environment and second characteristics information indicating characteristics of the users in the second environment.

In particular, there is a demand for performing clustering more accurately by taking both the first and second characteristics information of the users into account while respecting the users' privacy, that is, while a first provider that provides a first service relating to the first environment does not obtain the second characteristics information itself and a second provider that provides a second service relating to the second environment does not obtain the first characteristics information itself.

To solve the above problem, it is an object of the present invention to provide a processing system, a processing device, a processing method, a program, and an information storage medium that are suitable for dividing users into clusters separately using first characteristics information indicating characteristics of the users in a first environment and second characteristics information indicating characteristics of the users in a second environment.

Solution to Problem

To solve the above problem, a processing system according to the present invention includes a first processing device and a second processing device.

(a) The first processing device obtains first characteristics information indicating a characteristic of each of a plurality of users in a first environment, divides the plurality of users into first clusters according to the obtained first characteristics information, and transmits, to the second processing device, representation information representing characteristics of users belonging to each of the first clusters using a centroid vector based on the first characteristics information of the cluster.

(b) The second processing device obtains second characteristics information indicating a characteristic of each of the plurality of users in a second environment, and divides the plurality of users into second clusters according to the transmitted representation information and the obtained second characteristics information.

Advantageous Effects of Invention

The present invention provides a processing system, a processing device, a processing method, a program, and an information storage medium that are suitable for dividing users into clusters separately using first characteristics information indicating characteristics of the users in a first environment and second characteristics information indicating characteristics of the users in a second environment.

DESCRIPTION OF EMBODIMENTS

The following describes an embodiment of the present invention. The embodiment is presented for illustrative purposes only, and is not intended to limit the scope of the present invention. Those skilled in the art can use embodiments in which some or all elements of the embodiment are replaced with their equivalents, and it should be understood that such embodiments also fall within the scope of the present invention.

Figure 1:
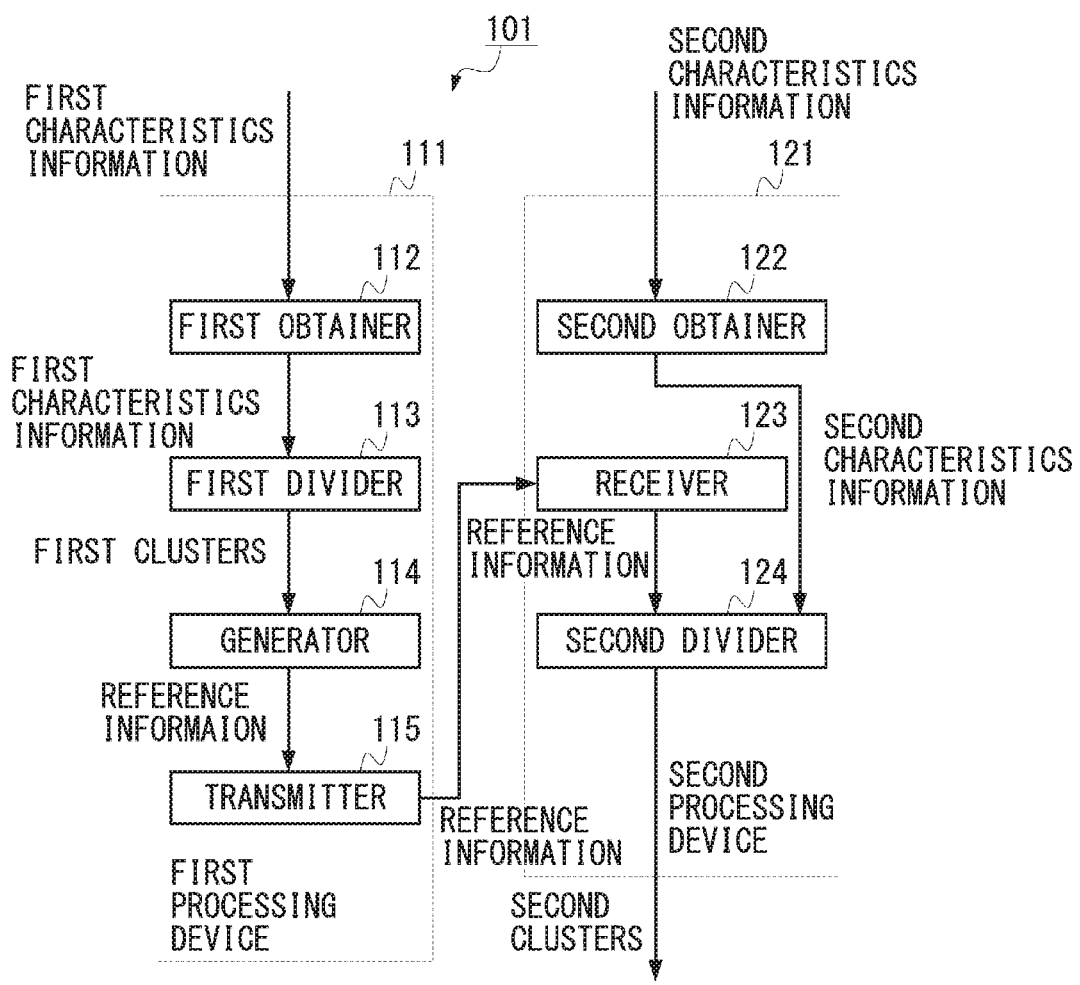
FIG. 1 is a diagram schematically illustrating a configuration of a processing system according to an embodiment of the present invention.

FIG. 1 is a diagram schematically illustrating a configuration of a processing system according to the embodiment of the present invention. The following describes the processing system with reference to this diagram.

As shown in this diagram, a processing system 101 includes a first processing device 111 and a second processing device 121.

The first processing device 111 and the second processing device 121 each include a computer or an electronic circuit that is separate from the other processing device. The first processing device 111 is managed by a provider of a service relating to a first environment. The second processing device 121 is managed by a provider of a service relating to a second environment. Thus, information exchangeable between both the providers is usually limited.

In a case where a first computer executes a first program to provide the first processing device 111 and a second computer executes a second program to provide the second processing device 121, each program to be executed by the corresponding computer can be stored in a computer-readable non-transitory information storage medium, such as a compact disk, a flexible disk, a hard disk, a magneto-optical disk, a digital video disk, a magnetic tape, a read only memory (ROM), an electrically erasable programmable ROM (EEPROM), a flash memory, or a semiconductor memory. This information storage medium can be distributed and sold separately from each computer.

In each computer, a program stored in a non-transitory information storage medium, such as a flash memory, is read into a random access memory (RAM), and instructions included in the read program are executed by a central processing unit (CPU). For an architecture that can map a ROM and a RAM into one memory space, however, a CPU directly reads and executes instructions included in a program stored in the ROM.

Each program can be distributed and sold, separately from a computer that will execute the program, over a transitory transmission medium such as a computer network, for example, from a distribution or management server managed by a business operator to the computer.

The first processing device 111 and the second processing device 121 can be implemented in an application specific integrated circuit (ASIC). The first processing device 111 and the second processing device 121 in this embodiment can be implemented using a field programmable gate array (FPGA), which compiles a program into a design script for an electronic circuit and dynamically builds the electronic circuit based on the design script, or other intermediate technologies between a computer and an ASIC.

The following describes this embodiment using mathematical vectors and sets, which are expressed as numerical arrays on computers. Computation of such numerical arrays can be performed at high speed using a floating-point unit (FPU) math coprocessor, a graphics processing unit (GPU), or the like.

Figure 2:
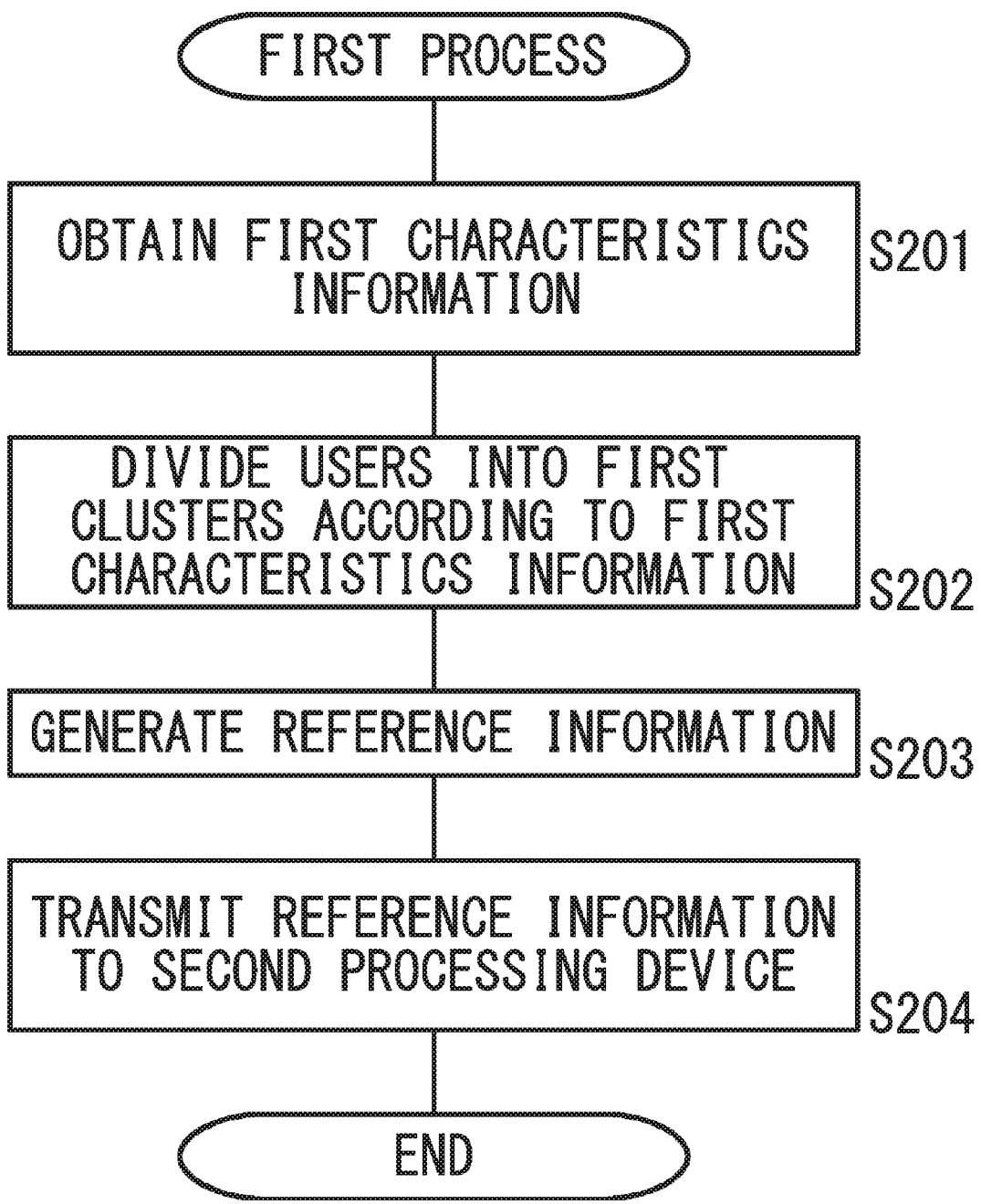
FIG. 2 is a flowchart showing a control flow of a first process executed by a first processing device of the present invention.
Figure 3:
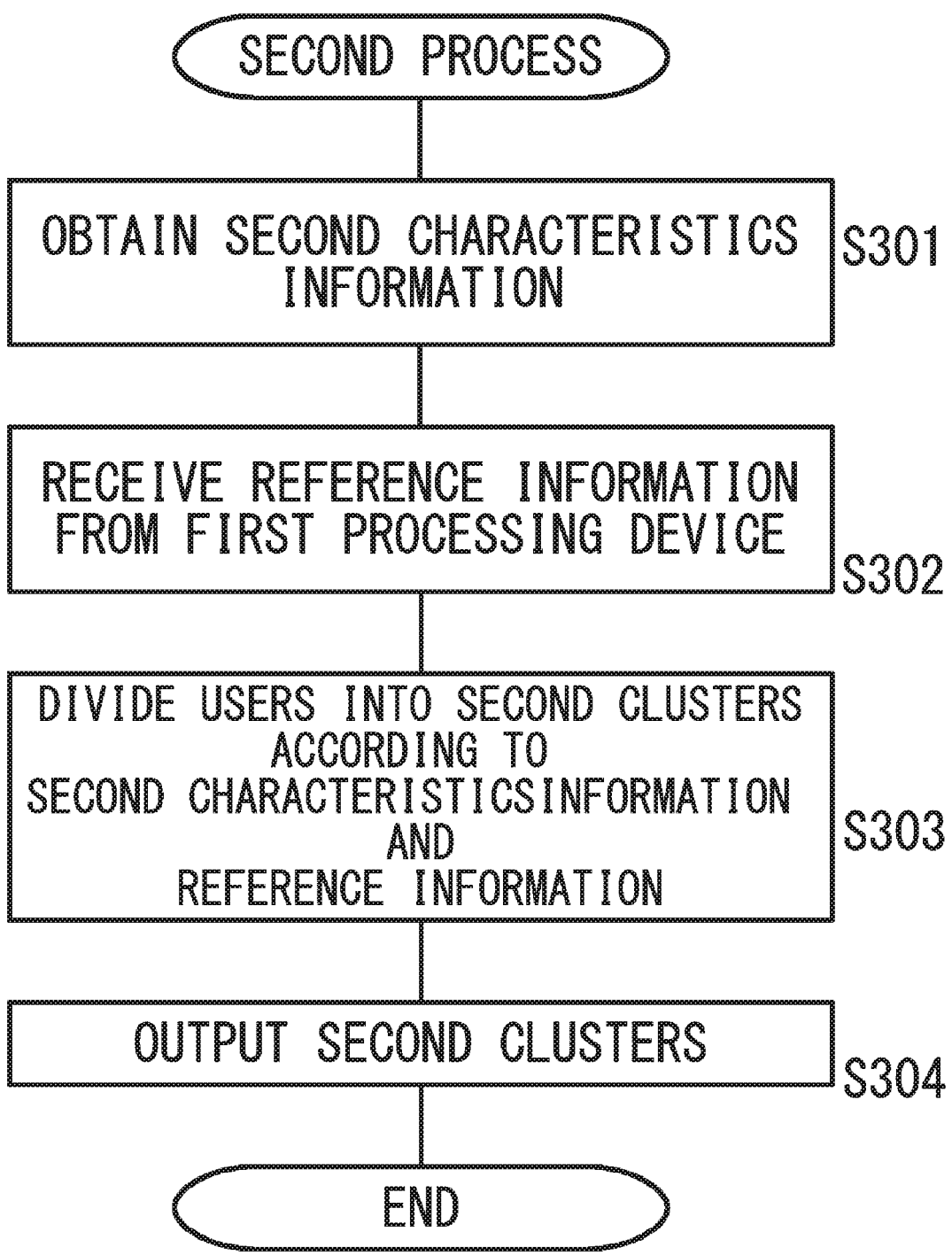
FIG. 3 is a flowchart showing a control flow of a second process executed by a second processing device of the present invention.

FIG. 2 is a flowchart showing a control flow of a first process executed by the first processing device of the present invention. FIG. 3 is a flowchart showing a control flow of a second process executed by the second processing device of the present invention. The following describes the control flows with reference to these flowcharts.

When the first processing device 111 starts the first process, a first obtainer 112 obtains first characteristics information $u_1, u_2, \ldots, u_N$ respectively indicating characteristics of users $1, 2, \ldots, N$ in the first environment (Step S201).

On the other hand, when the second processing device 121 starts the second process, a second obtainer 122 obtains second characteristics information $v_1, v_2, \ldots, v_N$ respectively indicating characteristics of the users $1, 2, \ldots, N$ in the second environment (Step S301).

The first characteristics information $u_1, u_2, \ldots, u_N$ and the second characteristics information $v_1, v_2, \ldots, v_N$ are respectively vectors indicating characteristics of the users $1, 2, \ldots, N$. These vectors are sometimes called feature vectors in the field of clustering technology.

The first environment, where the first characteristics information $u_1, u_2, \ldots, u_N$ is obtained, and the second environment, where the second characteristics information $v_1, v_2, \ldots, v_N$ is obtained, are generally different. Thus, the dimension of the vector $u_i$ and the dimension of the vector $v_j$ are generally different, and the type of a characteristic value indicated by the k-th element of the vector $u_i$ and the type of a characteristic value indicated by the k-th element of the vector $v_j$ are generally different.

Example characteristic values of a user can include not only the user's gender, age, age group, occupation, place of residence, annual income, family structure, and other relatively static information, but also the user's actions and behavior in a service that provides an environment where the characteristic values are collected, such as how many times, how often, what time period, and when the user accessed the service, how many times, how often, what time period, and when the user obtained content or products provided in the service, whether an object to be obtained is free or paid, how much was paid for the object, of what kind the object is, and other various digitized history information.

Each user's feature vector is generated by collecting and totaling, for the user, such feature values and then arranging them in a predetermined order. This feature vector is feature information indicating the user's characteristic.

To facilitate understanding, users are identified by the integers from 1 to N, that is, $1, 2, \ldots, N$. In practice, under each environment, users may be identified by user names such as email addresses that the users registered in the corresponding service, terminal identification information such as the serial numbers of terminals that the users used when using the corresponding service, session IDs stored as browser cookies, or terminal identification IDs for advertisement (e.g., identifications for advertisers (IDFAs) or advertising identifiers (AdIDs)) used on smartphones and tablets.

When information is exchanged between the first processing device 111 and the second processing device 121, a converter such as a hub server separated from both the first processing device 111 and the second processing device 121 may convert between user identification information for the first processing device 111 and user identification information for the second processing device 121.

A first divider 113 of the first processing device 111 divides the users 1, 2, ..., N into first clusters P[1], P[2], ..., P[S] by performing clustering on the obtained first characteristics information $u_1, u_2, \ldots, u_N$ (Step S202). Thus, $$P[1] \cup P[2] \cup \ldots \cup P[S] = \{1, 2, \ldots, N\};$$

$$P[i] \cap P[j] = \{\ \} (i, j = 1, 2, \ldots, S; j \neq i)$$

hold true.

The first divider 113 can use various known techniques for clustering. For example, the first divider 113 can use divisive optimization clustering techniques, such as k-means and x-means, and hierarchical clustering techniques, such as a centroid method, a Ward method, and a group average method. As a distance function d(_,_) for characteristics information, the Euclidean distance and the Manhattan distance can be used. Scaling may be performed using the Mahalanobis distance.

Subsequently, a generator 114 of the first processing device 111 generates reference information obtained by dividing the users 1, 2, ..., N into the first clusters P[1], P[2], ..., P[S] (Step S203). This reference information is to be referred as information similar to training information and guidelines information for clustering when the second processing device 121 divides the users.

The reference information is information expressing characteristics of the users 1, 2, ..., N, but the content of the information is limited so that the second processing device 121 cannot identify the first characteristics information $u_1$, $u_2, \ldots, u_N$. Thus, even when the reference information is transmitted to the second processing device 121, the first characteristics information $u_1, u_2, \ldots, u_N$ is not leaked. In this embodiment, either belonging information or representation information can be used as the reference information.

The belonging information is information indicating which of the first clusters the users 1, 2, ..., N belong to by the first characteristics information $u_1, u_2, \ldots, u_N$. The belonging information may be any information from which a set of

P[1], P[2], ..., P[S],

{P[1], P[2], ..., P[S]} each of which is a set of user numbers, can be derived.

For example, when the user i belongs to the cluster P[j] (i.e., i∈P[j]), the generator 114 can generate N S-dimensional vectors in which the j-th element is nonzero and the other elements are zero, and determine all the N S-dimensional vectors to be the belonging information, where N is the number of all users.

If the value of the nonzero element is set to one, the belonging information becomes a set of N S-dimensional unit vectors.

The nonzero element may be set to $$c(P[j]) = \Sigma_{k \in P[j]} u_k / |P[j]|$$

which is the degree of similarity between the characteristics information $u_i$ of the user i and the centroid vector of the cluster P[j] to which the user i belongs.

Specifically, for example, the degree of similarity may be the cosine of the angle between the characteristics information $u_i$ of the user i and the centroid vector c(P[j]) of the cluster P[j] to which the user i belongs.

Alternatively, for example, the degree of similarity may be the function that decreases as the distance D from the centroid vector c(P[j]) of the cluster P[j] to the characteristics information $u_i$ increases, such as $\exp(-D^2)$, $\exp(-|D|)$, or $1/(1+D)$, where the distance D is calculated using D=d(c(P[j]),$u_i$). Hereinafter, the degree of similarity between the first characteristics information $u_i$ of the user i and the centroid vector of the cluster P[j] to which the user i belongs is referred to as $s_i$.

The representation information is information about the cluster to which each user belongs, which represents information obtained from the first characteristics information $u_1$, $u_2, \ldots, u_N$ so that the characteristic of each user from cannot be identified. The representation information may be the centroid of the cluster to which each user belongs.

That is, when the user i belongs to the cluster P[j], the generator 114 generates the centroid vector of the cluster P[j] in association with the user i in place of the first characteristics information $u_i$, and determines all the N centroid vectors to be the representation information, where N is the number of all users. The centroid vector of a cluster corresponds to the average of characteristics information of users who belong to the cluster and is calculated in the clustering process. Thus, this can be used as personally unidentifiable information that expresses characteristics of the users.

The representation information can include the above degree of similarity. The use of the degree of similarity can adjust how much the second processing device 121 should reflect the representation information in clustering.

The following describes modes where a set of vectors $w_1$, $w_2, \ldots, w_N$ corresponding one-to-one to the users 1, 2, ..., N is used as the reference information.

In a belonging information mode, the j-th element of the vector $w_i$ is set to 1 or the degree of similarity $s_i$ of $u_1$ to c(P[j]), and the other elements are set to 0, for the cluster P[j] to which the user i belongs.

In a representation information mode, the vector $w_i$ is set to c(P[j]), for the cluster P[j] to which the user i belongs. In the representation information mode, the vectors $w_1$, $w_2, \ldots, w_N$ and the degrees of similarity $s_1, s_2, \ldots, s_N$ can be used together as the representation information.

The obtained reference information is transmitted from a transmitter 115 of the first processing device 111 to the second processing device 121 (Step S204), and the first process ends.

A receiver 123 of the second processing device 121 receives the reference information transmitted from the first processing device 111 (Step S302).

The second characteristics information may be obtained (Step S301) after the reference information is received (Step S302). Alternatively, Step S301 may be performed before Step S302. Alternatively, both Steps S301 and S302 may be performed concurrently.

Subsequently, a second divider 124 of the second processing device 121 divides the users 1, 2, ..., N into second clusters Q[1], Q[2], ..., Q[T] by performing clustering on the transmitted reference information and the obtained second characteristics information $v_1, v_2, \ldots, v_N$ (Step S303). The second processing device 121 then outputs the second clusters Q[1], [2], ..., Q[T] as a result of dividing the users in the second environment in view of the first environment (Step S304), and terminates this process.

The second clusters Q[1], Q[2], ..., Q[T] satisfy the following conditions, as with the first clusters P[1], P[2], ..., P[S].

$$Q[1] \cup Q[2] \cup \ldots \cup Q[T] = \{1, 2, \ldots, N\};$$

$$Q[i] \cap Q[j] = \{\ \} (i, j = 1, 2, \ldots, T; j \neq i)$$

The restriction that the total number of the second clusters, T, is equal to the total number of the first clusters, S, may be added. Alternatively, in order to segment the users into a larger number of second clusters than the number of the first clusters, the restriction that S is smaller than T may be added, or S and T may be independent of each other.

The second divider 124 and the first divider 113 are similar in that they can use various known technique for clustering. However, the second divider 124 differs from the first divider 113 in that it uses not only the second characteristics information $v_1, v_2, \ldots, v_N$ but also the vectors $w_1, w_2, \ldots, w_N$ included in the reference information and the degrees of similarity $s_1, s_2, \ldots, s_N$ included in the reference information.

There are the following possible modes for clustering using the reference information.

In a first mode, concatenated vectors (integration vectors) obtained by respectively concatenating the second characteristics information $v_1, v_2, \ldots, v_N$ and the vectors $w_1, w_2, \ldots, w_N$ $v_2$++$w_2, \ldots, v_N$++$w_N$
are used as feature vectors for clustering.

A concatenated vector a++b, which is obtained by concatenating a vector a and a vector b, is a vector in which the elements of the vector a are followed by the elements of the vector b. The present application uses the operator "++" for vector concatenation.

Therefore, the dimension of the concatenated vector $v_i$++$w_i$ is equal to the sum of the dimension of the vector $v_i$ and the dimension of the vector $w_i$.

As described above, when the user i belongs to the cluster P[j], the vector $w_i$ in the belonging information mode is a vector in which the j-th element is nonzero (1 or the degree of similarity $s_i$) and the other elements are zero. Alternatively, the vector $w_i$ in the representation information mode is the centroid vector c(P[j]) or vector $s_i$c(P[j]) obtained by multiplying this and the degree of similarity.

Therefore, reference information vectors of users who belong to the same cluster through the clustering based on the first characteristics information are perfectly equal or point in the same direction.

Thus, clustering using vectors obtained by concatenating the reference information and the second characteristics information enables the results of the division based on the first characteristics information to be reflected in clustering using the second characteristics information. This divides the users into segments according to the users' characteristics more accurately without obtaining the first characteristics information.

In a second mode, the linear sum of the second characteristics information $v_1, v_2, \ldots, v_N$ and the vectors $w_1, w_2, \ldots, w_N$ $v_1 + w_1, v_2 + s_2 w_2, \ldots, v_N + s_N w_N$ or $v_1 + s_1 w_1, v_2 + s_2 w_2, \ldots, v_N + s_N w_N$ are used as feature vectors for clustering.

This mode can be applied to a case where the representation information is used as the reference information, a user's same type of characteristic values obtained under different environments are stored in each element of a feature vector that is the user's first characteristics information and the corresponding element of a feature vector that is the user's second characteristics information, and the characteristic values vary depending on the user's actions and behavior.

For example, a billing amount in the first environment and a billing amount in the second environment are to be added. Thus, meaningful information can be obtained by adding the billing amount element of a reference information vector obtained from the first characteristics information and the billing amount element of a reference information vector obtained from the second characteristics information.

In contrast, it is meaningless to add age in the first environment and age in the second environment. For such elements as are meaningless to add, not the elements of the reference information but the values of feature vectors for the second characteristics information themselves can be used for clustering.

It is noted that when an option is expressed as a numeric value to be stored in one element (e.g., a user's gender is expressed as "1" for males, "2" for females, or "0" for others), it is meaningless to add the element.

In contrast, when possible options are each assigned a different element in a feature vector, an element for a related option is set to nonzero, and an element for an unrelated option is set to zero (e.g., for males, the element "male gender" is set to 1, the element "female gender" is set to 0, and the element "other gender" is set to 0), there is no problem with adding the values of the vector.

When elements with a summable feature value are stored in different vector places between the first characteristics information and the second characteristics information, only the elements with the feature value may be picked out from the reference information vector and the second characteristics information, added, and then concatenated to the other elements.

The linear sum of vectors can be found by adding the vectors after multiplying the degree of similarity $s_i$ as a coefficient. When the user i belongs to the cluster P [j], the degree of similarity $s_i$ indicates how much the centroid c(P[j]) reflects the user i's characteristic. Thus, the linear sum using the degree of similarity $s_i$ improves the accuracy.

In a third method, the result of the division by the first divider 113
{P[1], P[2], ..., P[S]}
is derived from the belonging information or the representation information, and this result is used as an initial division by the second divider 124 to perform clustering on the second characteristics information $v_1, v_2, \ldots, v_N$.

The technique disclosed in Patent Literature 1 employs a random division as an initial division. However, as with this mode, the technique disclosed in Patent Literature 1 can be applied using
{P[1], P[2], ..., P[S]}
as an initial division.

Alternatively, hierarchical clustering may be performed using a mean vector based on
{P[1], P[2], ..., P[S]}
under the second environment, that is, $$e(P[j]) = k_{\in P[j]} v_k / |P[j]|$$

as the condensation point.

The centroid vector c(P[j]) in the first environment is the average of first characteristics information $u_k$ of k-th user who belong to the cluster. That is, the centroid is the average of characteristics information itself used for the division into clusters.

On the other hand, the mean vector e(P[j]) in the second environment is the average of second characteristics information $v_k$ obtained by the second processing device 121 for the k-th user who belong to each of the clusters into which the users are divided according to the first characteristics information by the first processing device 111. That is, the mean vector is the average of characteristics information (the second characteristics information) that is different from the characteristics information (the first characteristics information) used for the division into clusters.

In this manner, use of the belonging information can provide the division

{Q[1], Q[2], . . . , Q[T]} that is similar to the result of the division by the first divider 113

{P[1], P[2], . . . , P[S]} and corresponds to the second characteristics information $v_1, v_2, \ldots, v_N$.

The above techniques can also be applied to cases of performing clustering while keeping characteristics information collected in three or more environments separate.

The following steps are required to perform clustering for R environments one by one.

(1) In a first environment, clustering is performed according to first characteristics information to obtain first reference information based on the resulting first division.

(2) In a second environment, clustering is performed according to the first reference information and second characteristics information to obtain second reference information based on the resulting second division.

(R-1) In an (R-1)-th environment, clustering is performed according to the (R-2)-th reference information and (R-1)-th characteristics information to obtain (R-1)-th reference information based on the resulting (R-1)-th division. After that, (R) in an R-th environment, clustering is preferably performed according to the (R-1)-th reference information and R-th characteristics information to obtain an R-th division.

The following steps are required to perform clustering for R environments in parallel.

(1) In a first environment, clustering is performed according to first characteristics information to obtain first reference information based on the resulting first division.

(2) In a second environment, clustering is performed according to second characteristics information to obtain second reference information based on the resulting second division.

(R-1) In an (R-1)-th environment, clustering is performed according to (R-1)-th characteristics information to obtain (R-1)-th reference information based on the resulting (R-1)-th division. After that, (R) in an R-th environment, clustering is preferably performed according to the first reference information, the second reference information, . . . , the (R-1)-th reference information, and R-th characteristics information to obtain an R-th division.

SUMMARY

As described above, a processing system according to this embodiment includes a first processing device and a second processing device.

(a) The first processing device
obtains first characteristics information indicating a characteristic of each of a plurality of users in a first environment,
divides the plurality of users into first clusters according to the obtained first characteristics information, and
transmits, to the second processing device, representation information representing characteristics of users belonging to each of the first clusters using a centroid vector based on the first characteristics information of the cluster.

(b) The second processing device
obtains second characteristics information indicating a characteristic of each of the plurality of users in a second environment, and
divides the plurality of users into second clusters according to the transmitted representation information and the obtained second characteristics information.

In the processing system according to this embodiment, the second processing device may divide the plurality of users into second clusters according to integration vectors obtained by concatenating, for each user, the obtained second characteristics information and vectors relating to the transmitted representation information.

In the processing system according to this embodiment, the second processing device may divide the plurality of users into second clusters by finding, for each user, a linear sum of corresponding elements of the obtained second characteristics information and vectors relating to the transmitted representation information.

In the processing system according to this embodiment, the representation information may include the degree of similarity between a centroid based on the first characteristics information of a cluster to which the user belongs and first characteristics information obtained for the user, and the second processing device may change coefficients for the linear sum according to the degrees of similarity relating to the transmitted representation information.

A processing device according to this embodiment includes a receiver, an obtainer, and a divider.

The receiver receives, from another processing device, representation information representing characteristics of users belonging to each of first clusters using a centroid vector based on first characteristics information of the cluster. The first characteristics information indicates a characteristic of each of a plurality of users in a first environment. The plurality of users are divided into the first clusters according to the first characteristics information.

The obtainer obtains second characteristics information indicating a characteristic of each of the plurality of users in a second environment.

The divider divides the plurality of users into second clusters according to the received representation information and the obtained second characteristics information.

A processing method according to this embodiment is performed by a first processing device and a second processing device.

(a) The first processing device
obtains first characteristics information indicating a characteristic of each of a plurality of users in a first environment,
divides the plurality of users into first clusters according to the obtained first characteristics information, and
transmits, to the second processing device, representation information representing characteristics of users belonging to each of the first clusters using a centroid vector based on the first characteristics information of the cluster.

(b) The second processing device obtains second characteristics information indicating a characteristic of each of the plurality of users in a second environment, and divides the plurality of users into second clusters according to the transmitted representation information and the obtained second characteristics information.

A program according to this embodiment causes a computer to function as a receiver, an obtainer, and a divider.

The receiver receives, from another processing device, representation information representing characteristics of users belonging to each of first clusters using a centroid vector based on first characteristics information of the cluster. The first characteristics information indicates a characteristic of each of a plurality of users in a first environment. The plurality of users are divided into the first clusters according to the first characteristics information.

The obtainer obtains second characteristics information indicating a characteristic of each of the plurality of users in a second environment.

The divider divides the plurality of users into second clusters according to the received representation information and the obtained second characteristics information.

The above program is stored in a non-transitory computer-readable information storage medium according to this embodiment.

The present invention can be embodied in different forms and various modifications can be made thereto without departing from the broader spirit and scope thereof. The above-described embodiment of the present invention has been presented only for purposes of illustration, and is not intended to limit the scope of the invention. That is, the scope of the present invention is defined not by the embodiment but by the claims. Various modifications made within the claims and within the meaning of the invention equivalent to them are deemed to fall within the scope of the invention.

INDUSTRIAL APPLICABILITY

The present invention provides a processing system, a processing device, a processing method, a program, and an information storage medium that are suitable for dividing users into clusters separately using first characteristics information indicating characteristics of the users in a first environment and second characteristics information indicating characteristics of the users in a second environment.

REFERENCE SIGNS LIST

101 processing system
111 first processing device
112 first obtainer
113 first divider
114 generator
115 transmitter
121 second processing device
122 second obtainer
123 receiver
124 second divider

The invention claimed is:

1. A processing system comprising a first processing device and a second processing device, wherein (a) the first processing device obtains first characteristics information indicating a characteristic of each of a plurality of users in a first environment, divides the plurality of users into a plurality of first clusters according to the obtained first characteristics information of the plurality of users, wherein a first user of the plurality of users is allocated to a first cluster, among the plurality of first clusters, according to the obtained first characteristic information of the first user, and transmits, to the second processing device, representation information, which indicates, with respect to the first user of the plurality of users, a degree of similarity between a centroid vector of the first cluster, to which the first user has been allocated, and the first characteristics information obtained for the first user, upon which the first user has been allocated to the first cluster; and (b) the second processing device obtains second characteristics information indicating a characteristic of each of the plurality of users in a second environment that is different from the first environment, and divides the plurality of users into second clusters by using the transmitted representation information and the obtained second characteristics information for each of the plurality of users, wherein the second processing device allocates the first user into a second cluster, among the second clusters, by using, as a feature vector for clustering, a result of concatenating or combining (i) the degree of similarity between the centroid vector of the first cluster, to which the first user has been allocated, and the first characteristics information obtained for the first user, upon which the first user has been allocated to the first cluster, and (ii) the second characteristics information obtained for the first user.

2. The processing system according to claim 1, wherein the second processing device divides the plurality of users into the second clusters according to integration vectors obtained by concatenating, for each user, the obtained second characteristics information of a corresponding user and a vector relating to a degree of similarity indicated in the transmitted representation information of the corresponding user.

3. The processing system according to claim 1, wherein the second processing device divides the plurality of users into the second clusters by finding, for each user, a linear sum of the vector of corresponding elements of the obtained second characteristics information of a corresponding user and a vector relating to a degree of similarity indicated in the transmitted representation information of the corresponding user.

4. The processing system according to claim 3, wherein the second processing device changes coefficients for the linear sum according to degrees of similarity relating to the transmitted representation information.

5. The processing system according to claim 4, wherein the linear sum of vectors is found by adding the vectors after multiplying, as a coefficient, the vector relating to the degree of similarity to the vector of corresponding elements of the obtained first characteristics information of the corresponding user.

6. The processing system according to claim 1, wherein the degree of similarity is a function that decreases as a distance from the centroid vector of the first cluster, to which the first user has been allocated, to the first characteristics information obtained for the first user increases, and in the result of concatenating or combining the degree of similarity, indicated in the representation information for the first user, and the second characteristics information of the first user, a higher weight is given to a higher degree of similarity.

7. The processing system according to claim 1, wherein the centroid vector of the first cluster corresponds to an average of a plurality of pieces of first characteristics information of users, including the first user, who are allocated to the first cluster, and is calculated in a clustering process of the first cluster.

8. The processing system according to claim 7, wherein the degree of similarity corresponds to a cosine of an angle between the first characteristics information obtained for the first user and the centroid vector of the first cluster, to which the first user has been allocated.

9. A processing device comprising:
a receiver that receives, from another processing device, representation information related to each of a plurality of first clusters into which a plurality of users are clustered based on first characteristics information of each of the plurality of users, wherein a first user of the plurality of users is allocated to a first cluster, among the plurality of first clusters, according to the first characteristic information of the first user, the first characteristics information indicating a characteristic of each of the plurality of users in a first environment, the representation information indicating, with respect to the first user of the plurality of users, a degree of similarity between a centroid vector of the first cluster, to which the first user has been allocated, and the first characteristics information obtained for the first user, upon which the first user has been allocated to the first cluster;
an obtainer that obtains second characteristics information indicating a characteristic of each of the plurality of users in a second environment that is different from the first environment; and
a divider that divides the plurality of users into second clusters by using the received representation information and the obtained second characteristics information for each of the plurality of users,
wherein the divider allocates the first user into a second cluster, among the second clusters, by using, as a feature vector for clustering, a result of concatenating or combining (i) the degree of similarity between the centroid vector of the first cluster, to which the first user has been allocated, and the first characteristics information obtained for the first user, upon which the first user has been allocated to the first cluster, and (ii) the second characteristics information obtained for the first user.

10. A processing method performed by a first processing device and a second processing device, wherein
(a) the first processing device
obtains first characteristics information indicating a characteristic of each of a plurality of users in a first environment,
divides the plurality of users into a plurality of first clusters according to the obtained first characteristics information of the plurality of users, wherein a first user of the plurality of users is allocated to a first cluster, among the plurality of first clusters, according to the obtained first characteristic information of the first user, and
transmits, to the second processing device, representation information representing information, which indicates, with respect to the first user of the plurality of users, a degree of similarity between a centroid vector of the first cluster, to which the first user has been allocated, and the first characteristics information obtained for the first user, upon which the first user has been allocated to the first cluster; and
(b) the second processing device
obtains second characteristics information indicating a characteristic of each of the plurality of users in a second environment that is different from the first environment, and
divides the plurality of users into second clusters by using the transmitted representation information and the obtained second characteristics information for each of the plurality of users,
wherein the second processing device allocates the first user into a second cluster, among the second clusters, by using, as a feature vector for clustering, a result of concatenating or combining (i) the degree of similarity between the centroid vector of the first cluster, to which the first user has been allocated, and the first characteristics information obtained for the first user, upon which the first user has been allocated to the first cluster, and (ii) the second characteristics information obtained for the first user.

11. A non-transitory computer-readable information storage medium storing program, the program being executable by at least one processor to cause the at least one processor to function as:
a receiver that receives, from another processing device, representation information related to each of a plurality of first clusters into which a plurality of users are clustered based on first characteristics information of each of the plurality of users, wherein a first user of the plurality of users is allocated to a first cluster, among the plurality of first clusters, according to the first characteristic information of the first user, the first characteristics information indicating a characteristic of each of the plurality of users in a first environment, the representation information indicating, with respect to the first user of the plurality of users, a degree of similarity between a centroid vector of the first cluster, to which the first user has been allocated, and the first characteristics information obtained for the first user, upon which the first user has been allocated to the first cluster;
an obtainer that obtains second characteristics information indicating a characteristic of each of the plurality of users in a second environment that is different from the first environment; and
a divider that divides the plurality of users into second clusters by using the received representation information and the obtained second characteristics information for each of the plurality of users,
wherein the divider allocates the first user into a second cluster, among the second clusters, by using, as a feature vector for clustering, a result of concatenating or combining (i) the degree of similarity between the centroid vector of the first cluster, to which the first user has been allocated, and the first characteristics information obtained for the first user, upon which the first user has been allocated to the first cluster, and (ii) the second characteristics information obtained for the first user.

* * * * *